US007027512B2

(12) United States Patent
Jeon

(10) Patent No.: US 7,027,512 B2
(45) Date of Patent: Apr. 11, 2006

(54) SPATIO-TEMPORAL HYBRID SCALABLE VIDEO CODING APPARATUS USING SUBBAND DECOMPOSITION AND METHOD

(75) Inventor: Byeong-Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 594 days.

(21) Appl. No.: 10/125,846

(22) Filed: Apr. 19, 2002

(65) Prior Publication Data

US 2002/0154697 A1 Oct. 24, 2002

(30) Foreign Application Priority Data

Apr. 19, 2001 (KR) .............................. 2001-21155

(51) Int. Cl.
*H04N 7/12* (2006.01)

(52) U.S. Cl. ............ 375/240.16; 375/240; 375/240.01; 375/240.11; 375/240.12

(58) Field of Classification Search ................ 375/240, 375/240.01, 240.12, 240.16, 240.11; 382/248
See application file for complete search history.

(56) References Cited

U.S. PATENT DOCUMENTS 6,148,026 A * 11/2000 Puri et al. ................... 375/240
6,529,636 B1 * 3/2003 Aono et al. ................. 382/248

* cited by examiner

*Primary Examiner*—Allen Wong
(74) *Attorney, Agent, or Firm*—Lee, Hong, Degerman, Kang & Schmadeka

(57) ABSTRACT

In video coding techniques, in order to improve a coding efficiency and reduce a computational complexity sharply by mixing a temporal scalability and a spatial scalability, a spatio-temporal hybrid scalable video coding method using subband decomposition in accordance with the present invention includes classifying an input picture sequence into a picture of a low frame frequency BL (base layer) and a picture of a high frame frequency EL (enhancement layer) by sampling the sequence according to a time axis; decomposing the pictures on the BL and the EL into four subbands (LL, LH, HL, HH), coding the low frequency element subband (LL) at the spatial scalability BL having a low spatial resolution and coding the rest subbands (LH, HL, HH) at the EL having a high spatial resolution; decoding coding data of the temporal scalability BL in order to get a picture having a low temporal resolution and decoding coding data of the temporal scalability BL and the temporal scalability EL together in order to get a picture having a high temporal resolution; and decoding the subband (LL) of the spatial scalability BL in order to get a picture having a low spatial resolution and decoding the low frequency element subband (LL) and the high frequency element subbands (LH, HL, HH) together in order to get a picture having a high spatial resolution.

4 Claims, 5 Drawing Sheets

SPATIO-TEMPORAL HYBRID SCALABLE VIDEO CODING APPARATUS USING SUBBAND DECOMPOSITION AND METHOD

BACKGROUND OF THE INVENTION

1. Field of the Invention

The present invention relates to a scalability used in video coding techniques, and in particular to a spatio-temporal hybrid scalable video coding apparatus using subband decomposition and a method which are capable of improving a coding efficiency and reducing a computational complexity significantly by mixing temporal scalability with spatial scalability.

2. Description of the Prior Art

Generally, in a video communication on the Internet, because a network service quality about a transmission band is not guaranteed, it is difficult to transmit a service such as a moving picture with a high quality stably. In addition, in a decoder having a low processing capacity, it is a frequent occurrence not perfectly decoding received coding data.

Accordingly, in order to provide a service appropriate to a network condition and a decoder's processing capacity, an encoder generates bit stream having a high resolution or a low resolution, and transmits them to a decoder side. When a network condition is deteriorated, although a picture quality is lowered a little, a minimum low resolution quality has to be guaranteed. For that, a scalability method is used.

Scalability means a mechanism, providing various picture qualities in terms of spatial resolution, temporal resolution, and video quality The scalability can be largely divided into a spatial scalability, a temporal scalability and a SNR (signal to noise ratio) scalability.

The spatial scalability is divided into a EL (base layer) having a low spatial resolution and an EL (enhancement layer) having a high spatial resolution. In the EL, by generating a twice magnified picture in the width and length, namely, a four times magnified picture with respect to a picture of the BL by up-sampling the picture of the BL using an interpolation method, high efficiency encoding can be performed.

In addition, in the temporal scalability in which a frame frequency per one second can be varied while a spatial resolution is constantly maintained, coding is performed by decomposing layers into a BL having a low temporal resolution and can EL having a high temporal resolution. Herein, a picture sequence having a high temporal resolution can be gotten by inserting a B picture into a picture sequence having a low temporal resolution, and a predictive encoding method about a B picture has five modes such as a forward, a backward, a bidirectional, a direct and an intra.

In the meantime, the SNR scalability divides layers into a BL having a low picture quality and an EL having a high picture quality.

However, in the spatial scalability, as described above, the interpolation method is used for up-sampling, in that case, there is no much difference between the total bit quantity and a sum of each bit quantity calculated by each BL and EL. In other words, there is no encoding efficiency improvement as one of advantageousness of scalability.

In addition, when there is one decoder whose capacity includes temporal scalability and spatial scalability, it is required for the decoder to construct separately a temporal scalability processing module and a spatial scalability processing module. Accordingly, a complexity of the decoder is increased.

SUMMARY OF THE INVENTION

Accordingly, it is an object of the present invention to provide a coding method which is capable of providing a picture service having four different resolutions by encoding-generating a bit stream having four different characteristics and decoding the bit stream according to a network condition and a decoder's processing capacity by using a spatiotemporal hybrid scalability.

In addition, it is another object of the present invention to improve a coding efficiency by including low frequency subband information in a bit stream on a BL (base layer) and high frequency subband information in a bit stream on an EL (enhancement layer) through a spatial scalability using subband decomposition.

In addition, it is yet another object of the present invention to maximize a coding efficiency by reducing a bit ratio by using a motion vector of a BL in motion compensation of an EL without additionally transmitting information about a motion vector of the EL.

A spatio-temporal hybrid scalable video coding apparatus using subband decomposition in accordance with the present invention includes an encoder for applying a spatial scalability through a subband decomposition to a picture according to temporal scalability BL (basic layer)/EL (enhancement layer) in order to decompose the picture into four subbands, coding one low frequency element subband in a spatial scalability BL, coding the rest three high frequency element subbands in a spatial scalability EL, magnifying a motion vector calculated through a motion estimation of the subband in the spatial scalability BL twice and using the magnified value for a motion compensation of the spatial scalability EL; and a decoder for restoring the picture of the spatial scalability BL separated from the temporal scalability BL/EL by decoding the low frequency element subband and restoring the picture of the spatial scalability EL separated from the temporal scalability BL/EL by performing a motion compensation by magnifying the motion vector of the spatial scalability BL twice.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
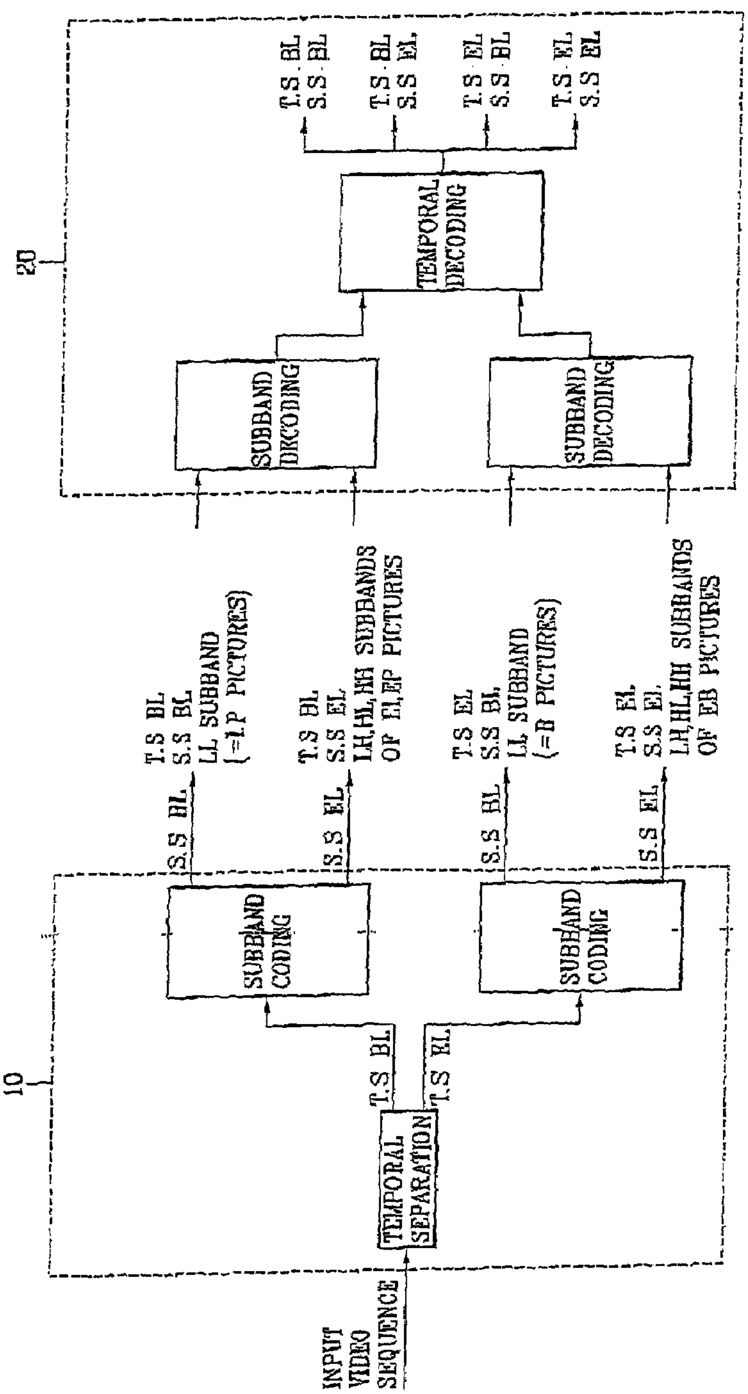
FIG. 1 is a schematic view illustrating an encoder and a decoder performing spatio-temporal scalability in accordance with the present invention.

A spatio-temporal hybrid scalable video coding method using subband decomposition in accordance with the present invention includes classifying an input picture sequence into a picture of a low frame frequency BL (base layer) and a picture of a high frame frequency EL (enhancement layer)

by sampling the sequence according to a time axis decomposing the pictures on the BL and the EL into four subbands (LL, LH, HL, HH), coding the low frequency element subband (LL) with a low spatial resolution at each temporal scalability BL and EL and coding the rest subbands (LH, HL, HH) with a high spatial resolution at each temporal scalability BL and EL; decoding coding data of the BL in order to get a picture having a low temporal resolution and decoding coding data of the BL and the EL together in order to get a picture having a high temporal resolution; and decoding the subband (LL) of the BL in order to get a picture having a low spatial resolution and decoding the low frequency element subband (LL) and the high frequency element subbands (LH, HL, HH) together in order to got a picture having a high spatial resolution.

An encoder 10 in accordance with the present invention consists of a first motion estimation unit 10A for calculating independently a motion vector in the low frequency element subband (LL) of the spatial scalability BL of the temporal scalability BL, calculating a residue between the motion vector and a predicted motion vector and outputting it; a first motion compensation unit 10B for calculating a predicted value of the low frequency subband (LL); a first residual coding unit 10C for calculating a residue between the predicted value of the low frequency subband (LL) and an inputted low frequency subband (LL) and outputting it; a variable length coding unit 10D for performing coding by receiving the residue of the first motion estimation unit 10A and the residue of the first residual coding unit 10C; a first residual decoding unit 10E for calculating a decoded residue; a first buffer 10F for storing the decoded low frequency subband (LL) by adding the decoded residue of 10E and the predicted value of 10B in order to be used at other picture's motion emtimation; a second motion compensation unit 10G for performing a motion compensation by magnifying the motion vector calculated in the spatial scalability BL of the temporal scalability BL twice; a second residual coding unit 10H for calculating a residue between the predicted value of the high frequency subbands (LH, HL, HH) and an inputted high frequency subbands (LH, HL, HH) when the motion-compensated result value is decomposed into four subbands (LL, LH, HL, HH) and outputting the residue; a second buffer 10I for synthesizing the decoded low frequency element subband (LL) in the spatial scalability BL of the temporal scalability BL with the high frequency element subbands (LH, HL, HH) decoded in the spatial scalability EL of the temporal scalability BL and storing it; a second residual decoding unit 10J for calculating a decoded residue; a second motion estimation unit 10K for calculating independently a motion vector in the low frequency subband (LL) of the spatial scalability BL of the temporal scalability EL and outputting it; a third motion compensation unit 10L for calculating a predicted value of the low frequency subband (LL) through a motion compensation; a third residual coding unit 10M for calculating a residue between the predicted value of the low frequency subband (LL) and an inputted low frequency subband (LL) and outputting it; a fourth motion compensation unit 10N for magnifying the motion vector calculated in the spatial scalability BL of the temporal scalability EL twice and performing a motion compensation by using the magnified value; and a fourth residual coding unit 10O for calculating a residue between the predicted value of the high frequency subbands (LH, HL, HH) and the inputted high frequency subband (LH, HL, LL) when the motion-compensated result value is decomposed into the four subbands (LL, LH, HL, HH) and outputting the residue.

In addition, a decoder 20 in accordance with the present invention includes a first motion compensation unit 20B for calculating a predicted value of a low frequency subband (LL) in the spatial scalability BL of the temporal scalability BL to be decoded by using a motion vector inputted from a variable length decoding unit 20A; a first residual decoding unit 20C for calculating a decoded low frequency subband (LL) residue about a bit stream transmitted to the decoder; a first buffer 20D for storing a decoded low frequency subband (LL) by adding the predicted vlaue of 20D to the decode residue of 20C; a second motion compensation unit 20E for performing a motion compensation by magnifying the motion vector calculated in the spatial scalability BL of the temporal scalability BL twice; a first subband analysis unit 20F for decomposing the motion-compensated value into four subbands (LL, LH, HL, HH); a first subband synthesis unit 20H for calculating the high frequency element subbands (LH, Ht. HH) of an EI or EP picture by adding the subbands (LH, HL, HH) as a predicted value of the high frequency element to the decoded residue through the variable length decoding unit 20A and the second residual decoding unit 20G and restoring an EI or EP picture as a picture in the spatial region by synthesizing the subbands (LH, HL, HH) with the subband (LL) decoded in the spatial scalability BL of the temporal scalability BL; a second buffer 20J for storing the restored macro block in spatial scalability EL of temporal scalability BL; a third motion compensation unit 20J for calculating a predicted value of low frequency subband (LL) in spatial scalability BL of the temporal scalability EL by using the I or P picture decoded in the spatial scalability BL of the temporal scalability BL and performing a motion compensation using the motion vector: a third residual decoding unit 20K for calculating a decoded low frequency subband (LL) residue and restoring a B picture by adding the predicted value through the motion compensation to the decoded residue; a fourth motion compensation unit 20L for calculating a predicted value of an EB picture by magnifying the motion vector in the spatial scalability BL of the temporal scalability EL twice and performing a motion compensation referencing an EI or EP picture decoded in the spatial scalability EL of the temporal scalability BL; a second subband analysis unit 20M for decomposing the motion-compensated value into the four subbands (LL, LH, HL, HH); a fourth residual decoding unit 20N for calculating a decoded high frequency subbands (LH, HL, HH) residue about a bit stream transmitted to the decoder; and a second subband synthesis unit 20O for restoring ah EB picture as a picture in the spatial region by calculating a high frequency element subbands (LH, HL, HH) value of the EB picture by adding the predicted high frequency subbands (LH, HL, HH) through the second subband analysis unit 20M to the residue decoded through the variable length decoding unit 20A and the fourth residual decoding unit 20N and synthesizing the calculated value with the subband (LL) decoded in the spatial scalability BL of the temporal scalability EL.

Hereinafter, the spatio-temporal scalability technique in accordance with the present Invention will be described with reference to accompanying FIGS. 1~3.

FIG. 1 is a schematic view illustrating an encoder and a decoder performing a spati-temporal scalability in accordance with the present invention.

As depicted in FIG. 1, by sampling an input picture sequence according to a time axis in the encoder 10, the input picture sequence is decomposed into an I picture or a P picture of a temporal scalability base layer (hereinafter, it is referred to as a T S BL) having a simple low frame frequency and a B picture of a temporal scalability enhancement layer (hereinafter it is referred to as a T. S EL) having a high frame frequency. Herein, the B picture is coded by using the conventional five prediction modes.

In addition, in the encoder 10, through spatial scalability subband coding using subbands analysis, each picture in the BL and EL of the temporal scalability is decomposed into four subbands (LL, LH, HL, HH). For a low spatial resolution, among the four subbands (LL, LH, HL, HH), the low frequency element subband (LL) is coded in the spatial scalability base layer (hereinafter, it is referred to as a S. S BL), for a high spatial resolution the rest three high frequency element subbands (LH, HL, HH) are coded in the spatial scalability enhancement layer (hereinafter, it is referred to as a S. S EL). Herein, in the S. S EL, a motion vector of the S. S EL is magnified twice, a result value is considered as a motion vector of the S. S EL and is used for a motion compensation of the S. S EL. Accordingly, time required for the motion estimation of the S. S EL can be saved, there is no need to transmit motion vector information, accordingly a bit quantity of the S. S EL can be reduced.

Finally, the encoder 10 generates a bit stream having four different characteristics and transmits it to the decoder 20.

In the meantime, in the decoder 20, the picture of the S. S BL separated from the T. S BL can be gotten by decoding the low frequency element subband (LL), other picture of the S. S EL separated from the T. S BL is restored through a subband synthesis process including the low frequency element subband (LL) decoded in the S. S BL. Herein, the motion compensation is performed by magnifying the motion vector of the T S BL twice.

In addition, it is possible to get the picture of the S. S BL separated from the T. S EL by decoding the low frequency element subband (LL). Herein, the motion compensation is performed by referencing an I or a P picture decoded in the S. S BL of the T S BL.

In addition, other picture of the S. S EL separated from the T. S EL is restored through a subband synthesis process including the low frequency element subband (LL) decoded in the S. S BL of the T.S BL. Herein, the motion compensation is performed by magnifying the motion vector of the S. S BL twice and referencing an EI picture or an EP picture of the S. S EL of the T. S BL.

After all the decoder 20 receives part of or whole four bit streams from the encoder 10 according to a network condition and a decoding processing capacity and restores four different pictures having different characteristics. Accordingly, a picture sequence inputted to the encoder 10 is restored into a picture signal having four different spatio-temporal resolutions and outputted The construction and the operation of the encoder 10 and the decoder 20 will be described in more detail with reference to accompanying FIGS. 2 and 4.

FIGS. 2A~2D are exemplary views illustrating a picture decoded according to a decoding capacity of a decoder in accordance with the present invention. As depicted in FIGS. 2A~2D, the decoder 20 receives part of or all four bit streams and restores four pictures having different characteristics.

Herein, FIGS. 2A~2D respectively illustrate examples such as [low temporal resolution/low spatial resolution], [low temporal resolution/high spatial resolution], [high temporal resolution/low spatial resolution] and [high temporal resolution/high spatial resolution]. In more detail. FIGS. 2A~2D illustrate pictures according to a decoding capacity of the decoder 20 such as [T. S decoding capacity non-available/S. S decoding capacity non-available], [T. S decoding capacity non-available/S. S decoding capacity available], [T. S decoding capacity available/S S decoding capacity non-available] and [T. S decoding capacity available/S. S decoding capacity available].

In FIGS. 2A~2D, "I" is an intra picture, "P" is a predictive picture, "B" is a bi-directional picture, "EI" is an enhanced I picture, "EP" is an enhanced P picture, "EB" is an enhanced B picture.

It will be described in more detail.

Figure 2A:
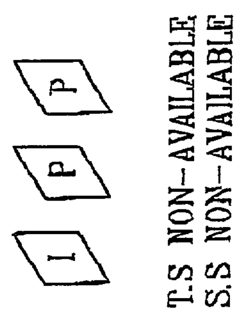
FIGS. 2A~2D are exemplary views illustrating pictures decoded according to a decoding capacity of a decoder in accordance with the present invention.

In FIG. 2A, because a decoder does not have temporal and spatial scalability processing capacities, it receives and decodes only bit stream of the T. S BL and the S. S BL, accordingly I and P pictures are showed.

Figure 2B:
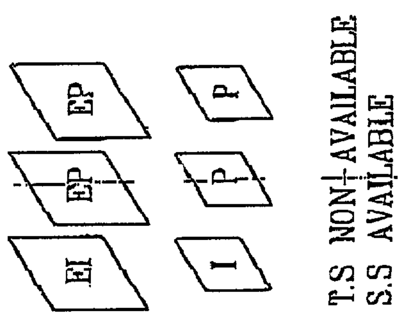

In FIG. 2B, because a decoder does not have a temporal scalability processing capacity but a spatial scalability processing capacity, it respectively receives and decodes a bit stream of the S. S BL of the T. S BL and a bit stream of the S. S EL of the T. S BL, accordingly EI and EP pictures of a decoded spatial resolution-improved EL are showed.

Figure 2C:
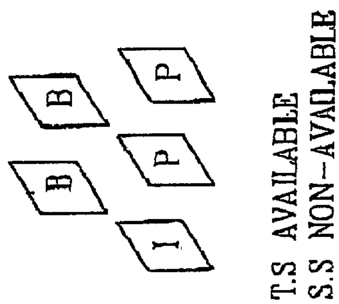

In FIG. 2C, because a decoder does not have a spatial scalability processing capacity but a temporal scalability processing capacity, it receives and decodes a bit stream of the S. S BL of the T. S BL and a bit stream of the S. S BL of the T. S EL, accordingly I and P pictures of a resolution-improved BL and B pictures of a resolution-improved EL are showed.

Figure 2D:
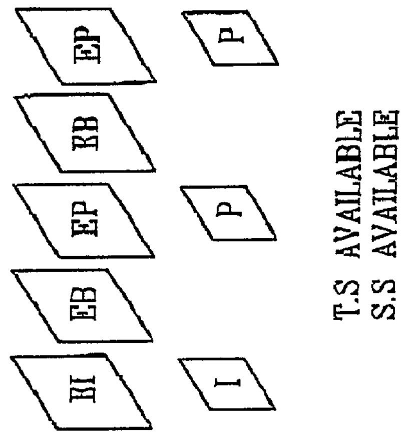

In FIG. 2D, because a decoder has both temporal scalability and spatial scalability processing capacities, it receives and decodes all four bit streams generated in an encoder, accordingly EI, EB and EP pictures are showed.

Figure 3A:
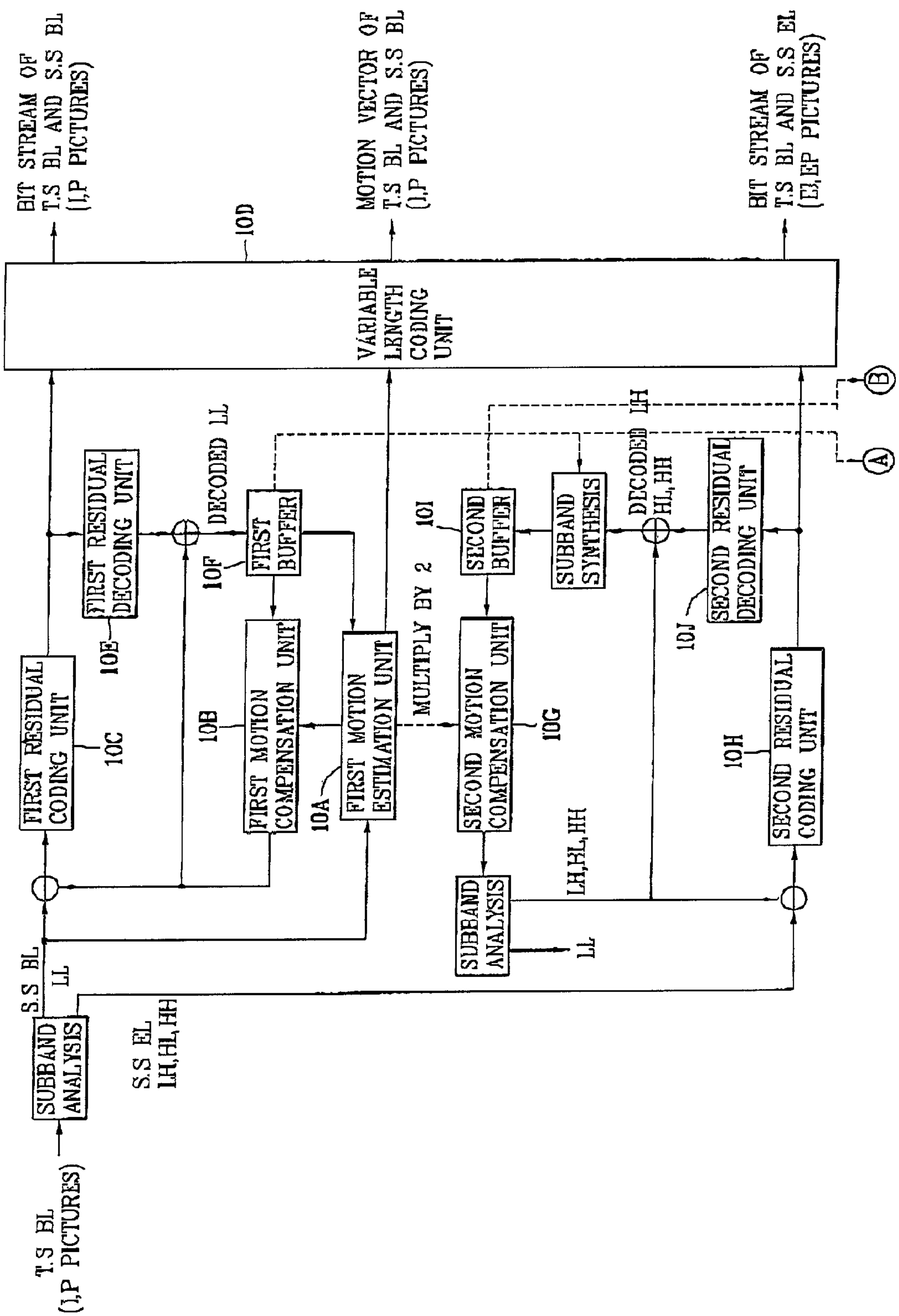
FIGS. 3A and 3B are detailed views illustrating the encoder of FIG. 1.
Figure 3B:
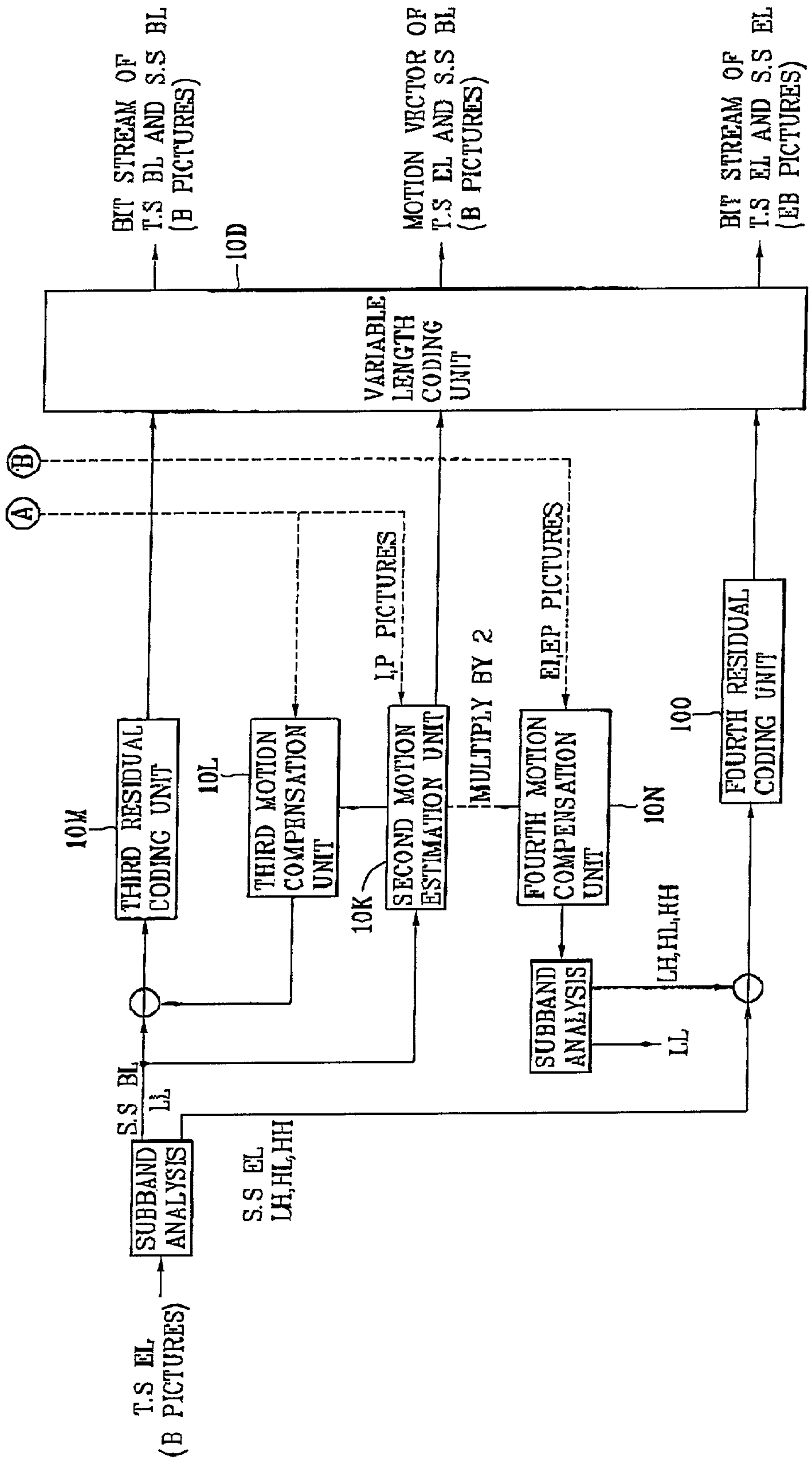
Figure 4:
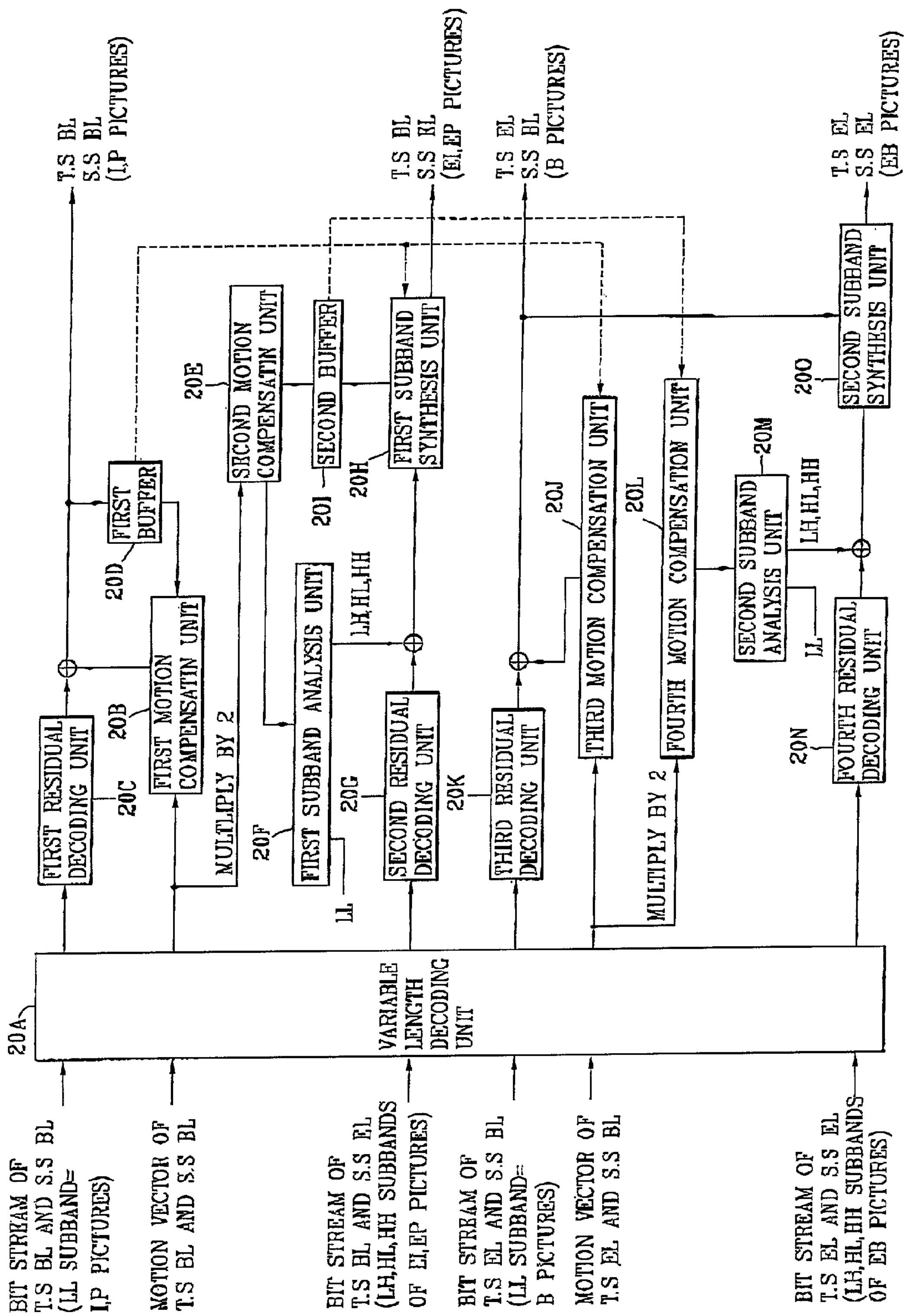
FIG. 4 is a detailed view illustrating the decoder of FIG. 1.

FIGS. 3A and 3B and 4 are detailed views illustrating an encoder and a decoder performing a spatio-temporal scalability in accordance with the present invention. Herein, a dotted-line arrow sign means that a certain specific value is referenced in operation of other units.

By sampling an inputted picture sequence according to a time axis, the encoder 10 divides the picture sequence into a picture (I or P picture) corresponded to the T. S BL and a picture (B picture) to be used in the T. S EL. After that, the pictures of the T. S BL and the T. S EL are decomposed into a subband (LL) having low frequency element and subbands (LH, HL, HH) having high frequency elements in the horizontal and vertical directions.

Herein, before describing generation of four bit streams through a certain coding process of the encoder 10, a bit stream generation process in a general encoder will be described. Herein, because coding of a picture is performed by macro-block units, the below described process is repeatedly performed in all macro-blocks of a picture to be coded presently.

1. A ME (motion estimation) unit calculates a motion vector of a macro-block by referring a reference frame in a buffer.

2. A residue between the motion vector and a predicted motion vector is calculated, and the residue is coded in a VLC (variable length coding) unit and is generated as a bit stream.

3. A MC (motion compensation) unit calculates a predicted value of a macro-block to be coded from the reference frame in the buffer by using the motion vector calculated in the first process.

4. A residue between the predicted Value of the macro-block and a macro-block inputted in an input end is calculated.

5. A bit stream about the residue is generated by coding data gotten through a DCT (descrete consine transform) unit and a quantization unit in the VLC unit. The process is called a residual coding.

6. For storing a present-coded picture in the buffer in order to use it in the ME unit of a next-inputted picture, a decoded residue is obtained by passing again the data, which passed the DCT unit and the quantization unit, through an inverse quantization unit and an inverse DCT unit.

7. Because the data is a residue, a decoded macro-block can be obtained by adding the predicted value of the macro-block calculated in the MC unit to the residue. The decoded macro-block is stored in the buffer for a motion estimation of a next picture.

Hereinafter, the operation of the encoder 10 performing a spatio-temporal scalability in accordance with the present invention will be described.

First, the first ME (motion estimation) unit 10A calculates independently a motion vector from the low frequency element subband (LL) of the S. S BL of the T S BL by performing a motion estimation and calculates a residue between the motion vector and a predicted motion vector The VLC (variable length coding) unit 10D generates a bit stream by coding the residue. The first MC (motion compensation) unit 10B calculates a predicted value of low frequency subband (LL) by performing motion compensation by using the motion vector and referencing the reference frame of the first buffer 10F.

After that, the first residual coding unit 10C calculates a residue between the predicted value of the low frequency subband (LL) and the inputted low frequency subband (LL). After that, the motion vector residue of the first ME unit 10A and the residue of the first residual coding unit 10C are outputted to the VLC unit 10D for coding. Accordingly, the bit stream transmitted from the S. S BL of the T. S BL includes the coded residue and the motion vector.

In addition, the first residual decoding unit 10E calculates a decoded residue in order to use a coded picture for motion estimation of a next-inputted picture, and the first buffer 10F stores the decoded low frequency subband (LL) by adding the decoded residue of the first residual decoding unit 10E and the predicted value of the first motion compensation unit 10B in order to be used at other picture's motion estimation.

In the meantime, in the high frequency element subbands (LH, HL, HH) of the S. S EL of the T. S BL, a process for calculating a motion vector through a motion estimation is omitted, the motion vector calculated through the S. S BL of the T. S BL is magnified twice and outputted to the second MC (motion compensation) unit 10G. Accordingly, by omitting a motion estimation process for obtaining a motion vector in a high spatial resolution, a computational complexity can be significantly reduced. Herein, the motion-compensated result value is decomposed again into four subbands (LL, LH, HL, HH).

Among the four subbands (LL, LH, HL, HH), subbands (LH, HL, HH) are used for a predicted value for residual coding in the S. S EL of the T. S BL. Herein, the second residual coding unit 10H calculates a residue between the predicted value of the high frequency subbands (LH, HL, HH) and an inputted high frequency subbands (LH, HL, HH) After that the residue is inputted to the VLC unit 10D for coding.

In order to be used for a reference frame for motion compensation of other picture, a present picture is re-decoded and stored in a specific storing space, and synthesis of the subband in the frequency region with the spatial region has to be performed. For that, the low frequency element subband (LL) decoded in the S. S BL of the T. S BL is synthesized with the high frequency element subbands (LH, HL, HH) of the S S EL of the T. S BL through the second residual decoding unit 10J and is stored in the second buffer 10I.

In the meantime, the second ME (motion estimation) unit 10K independently calculates a motion vector in the low frequency subband (LL) of the S. S BL of the T. S EL by the motion estimation, the third MC unit 10L calculates a predicted value of the low frequency subband (LL) by performing a motion compensation. After that, the third reside coding unit 10M calculates a residue between the predicted value of the low frequency subband (LL) and the inputted low frequency subband (LL). After that, the residue and the motion vector are outputted to the VLC unit 10D. In that case, the S S BL of the T. S EL means a B picture, and it is gotten through a motion estimation from the I picture or P picture decoded in the S S BL of the T. S BL because the B picture is not used as a reference picture. Dotted lines in the FIGS. 3A and 3B show referenced values. A bit stream transmitted from the S. S BL of the T. S. EL includes a coded residue and a motion vector.

In the meantime, in the high frequency element subbands (LH, HL, HH) of the S. S EL of the T. S EL, a process for calculating a motion vector through a motion estimation is omitted, the motion vector already obtained in the S. S BL of the T. S EL is magnified twice and outputted to the fourth MC (motion compensation) unit 10N, and the outputted value is used for a motion compensation. Herein, in the motion compensation, the EI picture or EP picture decoded in the S. S EL of the T S BL is used as a reference picture alike in the S. S EL of the T S EL. Herein, the motion-compensated value is decomposed into four subbands, among them the subbands (LH, HL, HH) are used as a predicted value for a residual coding in the S. S EL of the T. S EL. Herein, the fourth residual coding unit, 10O calculates a residue between the predicted value of the high frequency subbands (LH, HL, HH) and an inputted high frequency subbands (LH, HL, HH) After that, the residue is outputted to the VLC unit 10D for coding. A picture of the S. S EL of the T. S EL means an EB picture, it is not used as a reference picture, accordingly decoding process is omitted.

FIG. 4 illustrates the decoder 20 providable four different spatio-temporal resolutions about a bit stream transmitted from the encoder 10.

Before explaining FIG. 4, a bit stream decoding process in a general decoder will be described.

Decoding is performed by macro-block units in the decoder as well as the encoder, the below described processes will be equally applied to all macro-blocks.

1. Among transmitted bit streams, a motion vector is preferentially decoded. For that, first the decoder 20 calculates a predicted motion vector of a macro-block to be decoded, and decodes the motion vector value of the macro-block to be decoded by a residue of the inputted motion vector to the predicted motion vector value.

2. A MC (motion compensation) unit calculates a predicted value of the macro-block to be decoded by using the motion vector and referencing a reference frame of a buffer.

3. A decoded macro-block residue is calculated by passing the transmitted bit stream through the VLD (variable length decoding) unit and a residual decoding unit.

4. A decoded macro-block is calculated by adding the predicted macro-block to the decoded macro-block residue.

5. The decoded macro-block is stored in a buffer for a motion compensation of a next picture.

Hereinafter, the operation of the decoder 20 performing a spatio-temporal scalability in accordance with the present invention will be described.

A bit stream of the S. S BL of the T. S BL includes a residue and a motion vector of the subband (LL) as a low frequency element of an I picture or a P picture.

First, the first MC (motion compensation) unit 20B calculates a predicted value of a low frequency subband (LL) to be decoded by using the motion vector inputted from the VLD unit 20A and referencing a reference frame of the buffer In the meantime, a residue of the decoded low frequency subband (LL) is decoded through the VLD (variable length decoding) unit 20A and the first residual coding unit 20C.

The decoded low frequency subband (LL) is stored by adding the predicted value of the first motion compensation unit 20B to the decoded residue of the first residual coding unit 20C. Herein, the decoded low frequency subband (LL) means an I picture or a P picture. After that, the decoded low frequency subband (LL) is stored in the first buffer 20D for a motion compensation of a next picture.

The bit stream of the S. S EL of the T. S BL includes a residue of the subbands (LH, HL, HH) as high frequency elements of the EI picture or EP picture. The second MC (motion compensation) unit 20E performs a motion compensation by magnifying the motion vector calculated in the S. S BL of the T. S BL twice as same as the encoder 10, the motion-compensated value is decomposed into four subbands. Among them, the subbands (LH, HL, HH) are a predicted value of the high frequency element, a value of the subbands (LH, HL, HH) as a high frequency element of the EI or EP picture is calculated by adding the predicted value to a residue decoded through the VLD unit 20A and the second residual decoding unit 20G. Herein, the EI or EP picture as a picture of the spatial region is restored through synthesis with the subband (LL) decoded in the Ls. S BL of the T S BL. After that, the decoded EI picture or EP picture are stored in the second buffer 20I for motion compensation of a next picture.

Alike the S. S BL of the T. S BL, the bit stream of the S. S BL of the T. S EL includes a residue and a motion vector of the subband (LL) as a low frequency element of the B picture. Herein, the third MC (motion compensation) unit 20J receives an I or P picture decoded in the S. S BL of the T. S BL and performs a is motion compensation using the motion vector, accordingly a predicted value of low frequency subband (LL) is calculated. After that, a B picture is restored by adding the predicted value to a decoded residue and a decoded low frequency subband (LL) residue is calculated through the third residual decoding unit 20K.

The bit stream of the S. S EL of the T. S EL includes a residue of the subbands (LH. HL. HH) as the high frequency element of the EB picture. Accordingly, alike the encoder 10, the motion vector of the S. S BL of the T. S EL is magnified twice, the fourth MC (motion compensation) unit 20L performs a motion compensation referencing the EI picture or EP picture decoded in the S. S EL of the T. S BL in order to a predicted value of the EB picture. According to this, LH, HI, HH as a predicted value of the high frequency element through the subband decomposition is calculated, and a subband value (LH, HL, HH) of the EB picture is calculated by adding the predicted value through the motion compensation to the residue decoded through the fourth residual decoding unit 20N. Finally, in the second subband synthesis unit 200, the subband values (LH, HL, HH) of the EB picture are synthesized with the subband (LL) decoded in the S. S BL of the T. S EL, accordingly the EB picture as a picture in the spatial region is restored.

As described above, an encoder in accordance with the present invention can generate coding data having four different spatio-temporal resolutions, namely, bit streams, and a decoder can receive a part or all four different bit streams according to a scalability processing capacity, accordingly four different services can be provided In addition, through a spatial scalability implement using subband decomposition In accordance with the present invention, a bit stream of a BL includes information about a low frequency element subband (LL), a bit stream of an EL includes information about high frequency element subbands (LH, HL, HH), accordingly coding efficiency can be improved.

In addition, because a spatial scalability using subbands in accordance with the present invention performs a motion compensation by magnifying a motion vector of a BL twice, an EL according to the spatial scalability omits a motion estimation process, accordingly a computational complexity in an encoder can be reduced.

In addition, an EL according to a spatial scalability in accordance with the present invention does not have to transmit a motion vector independently, a size of a bit stream in the EL decreases, accordingly a bit ratio is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore Intended to be embraced by the appended claims.

What is claimed is:

1. A spatio-temporal hybrid scalable video coding apparatus using subband decomposition, comprising:

an encoder for applying a spatial scalability through a subband decomposition to a picture according to temporal scalability BL (base layer)/EL (enhancement layer) in order to decompose the picture into four subbands, coding one low frequency element subband in a spatial scalability BL, coding the rest three high frequency element subbands in a spatial scalability EL, magnifying a motion vector calculated through a motion estimation of the subband in the spatial scalability BL twice and using the magnified value for a motion compensation of the spatial scalability EL; and a decoder for restoring the picture of the spatial scalability BL separated from the temporal scalability BL/EL by decoding the low frequency element subband and restoring the picture of the spatial scalability EL separated from the temporal scalability BL/EL by performing a motion compensation by magnifying the motion vector of the spatial scalability BL twice;

wherein the encoder comprises:

a first motion estimation unit 10A for calculating independently a motion vector in the low frequency element subband (LL) of the spatial scalability BL of the temporal scalability BL, calculating a residue between the motion vector and a predicted motion vector and outputting it; a first motion compensation unit 10B for calculating a predicted value of the low frequency subband (LL);

a first residual coding unit 10C for calculating a residue between the predicted value of the low frequency subband (LL) and an inputted low frequency subband (LL) and outputting it;

a variable length coding unit 10D for performing coding by receiving the residue of the first motion estimation unit 10A and the residue of the first residual coding unit 10C;

a first residual decoding unit 10E for calculating a decoded residue;

a first buffer 10F for storing the decoded low frequency subband (LL) by adding the decoded residue of the first residual decoding unit 10E to the predicted value of the first motion compensation unit 10B in order to be used at other picture's motion estimation;

a second motion compensation unit 10G for performing a motion compensation by magnifying the motion vector calculated in the spatial scalability BL of the temporal scalability BL twice;

a second residual coding unit 10H for calculating a residue between the predicted value of the high frequency subbands (LH, HL, HH) and an inputted high frequency subband (LH, HL, HH) when the motion-compensated result value is decomposed into four subbands (LL, LH, HL, HH) and outputting the residue;

a second buffer 10I for synthesizing the decoded low frequency element subband (LL) in the spatial scalability BL of the temporal scalability BL with the high frequency element subbands (LH, HL, HH) decoded in the spatial scalability EL of the temporal scalability BL and storing it;

a second residual decoding unit 10J for calculating a decoded residue;

a second motion estimation unit 10K for calculating independently a motion vector in the low frequency subband (LL) of the spatial scalability BL of the temporal scalability EL and outputting it;

a third motion compensation unit 10L for calculating a predicted value of the low frequency subband (LL) through a motion compensation;

a third residual coding unit 10M for calculating a residue between the predicted value of the low frequency subband (LL) and an inputted low frequency subband (LL) and outputting it; a fourth motion compensation unit 10N for magnifying the motion vector calculated in the spatial scalability BL of the temporal scalability EL twice and performing a motion compensation by using the magnified value; and a fourth residual coding unit 10O for calculating a residue between the predicted value of the high frequency subbands (LH, HL, HH) and the inputted high frequency subbands (LH, HL, HH) when the motion-compensated result value is decomposed into the four subbands (LL, LH, HL, HH) and outputting the residue.

2. A spatio-temporal hybrid scalable video coding apparatus using subband decomposition, comprising:

an encoder for applying a spatial scalability through a subband decomposition to a picture according to temporal scalability BL (base layer)/EL (enhancement layer) in order to decompose the picture into four subbands, coding one low frequency element subband in a spatial scalability BL, coding the rest three high frequency element subbands in a spatial scalability EL, magnifying a motion vector calculated through a motion estimation of the subband in the spatial scalability BL twice and using the magnified value for a motion compensation of the spatial scalability EL; and a decoder for restoring the picture of the spatial scalability BL separated from the temporal scalability BL/EL by decoding the low frequency element subband and restoring the picture of the spatial scalability EL separated from the temporal scalability BL/EL by performing a motion compensation by magnifying the motion vector of the spatial scalability BL twice;

wherein the decoder comprises:

a first motion compensation unit 20B for calculating a predicted value of a low frequency subband (LL) in the spatial scalability BL of the temporal scalability BL to be decoded by using a motion vector inputted from a variable length decoding unit 20A;

a first residual decoding unit 20C for calculating a decoded low frequency subband (LL) residue about a bit stream transmitted to the decoder;

a first buffer 20D for storing a decoded low frequency subband (LL) by adding the predicted value of first motion compensation unit 20B to the decoded residue of first residual decoding unit 20C;

a second motion compensation unit 20E for performing a motion compensation by magnifying the motion vector calculated in the spatial scalability BL of the temporal scalability BL twice;

a first subband analysis unit 20F for decomposing the motion-compensated value into four subbands (LL, LH, HL, HH);

a first subband synthesis unit 20H for calculating the high frequency element subbands (LH, HL, HH) of an EI or EP picture by adding the predicted value of the high frequency subbands (LH, HL, HH) to the decoded residue through the variable length decoding unit 20A and the second residual decoding unit 20G and restoring an EI or EP picture as a picture in the spatial region by synthesizing the subbands (LH, HL, HH) with the subband (LL) decoded in the spatial scalability BL of the temporal scalability BL;

a second buffer 20I for storing the restored macro block in spatial scalability EL of temporal scalability BL;

a third motion compensation unit 20J for calculating a predicted value of the low frequency subband (LL) in spatial scalability BL of the temporal scalability EL by using the I or P picture decoded in the spatial scalability BL of the temporal scalability BL and performing a motion compensation using the motion vector;

a third residual decoding unit 20K for calculating a decoded low frequency subband (LL) residue and restoring a B picture by adding the predicted value through the motion compensation to the decoded residue;

a fourth motion compensation unit 20L for calculating a predicted value of an EB picture by magnifying the motion vector in the spatial scalability BL of the temporal scalability EL twice and performing a motion compensation referencing an EI or EP picture decoded in the spatial scalability EL of the temporal scalability BL;

a second subband analysis unit 20M for decomposing the motion-compensated value into the four subbands (LL, LH, HL, HH);

a fourth residual decoding unit 20N for calculating a decoded macro-block residue about a bit stream transmitted to the decoder; and a second subband synthesis unit 20O for restoring an EB picture as a picture in the spatial region by calculating a high frequency element subbands (LH, HL, HH) value of the EB picture by adding the subbands (LH, HL, HH) as a predicted value of high frequency element to the residue decoded through the variable length decoding unit 20A and the fourth residual decoding unit 20K and synthesizing the calculated value with the subband (LL) decoded in the spatial scalability BL of the temporal scalability EL.

3. A spatio-temporal hybrid scalable video coding apparatus using subband decomposition, comprising:

an encoder for applying a spatial scalability through a subband decomposition to a picture according to temporal scalability BL (base layer)/EL (enhancement layer) in order to decompose the picture into four subbands, coding one low frequency element subband in a spatial scalability BL, coding the rest three high frequency element subbands in a spatial scalability EL, magnifying a motion vector calculated through a motion estimation of the subband in the spatial scalability BL twice and using the magnified value for a motion compensation of the spatial scalability EL; and a decoder for restoring the picture of the spatial scalability BL separated from the temporal scalability BL/EL by decoding the low frequency element subband and restoring the picture of the spatial scalability EL separated from the temporal scalability BL/EL by performing a motion compensation by magnifying the motion vector of the spatial scalability BL twice.

wherein the encoder includes a first motion estimation unit 10A for calculating independently a motion vector in the low frequency element subband (LL) of the spatial scalability BL of the temporal scalability BL, calculating a residue between the motion vector and a predicted motion vector and outputting it;

a first motion compensation unit 10B for calculating a predicted value of the low frequency subband (LL);

a first residual coding unit 10C for calculating a residue between the predicted value of the low frequency subband (LL) and an inputted low frequency subband (LL) and outputting it;

a variable length coding unit 10D for performing coding by receiving the residue of the first motion estimation unit 10A and the residue of the first residual coding unit 10C;

a first residual decoding unit 10E for calculating a decoded residue;

a first buffer 10F for storing the decoded low frequency subband (LL) by adding the decoded residue of the first residual decoding unit 10E to the predicted value of the first motion compensation unit 10B in order to be used at other picture's motion estimation;

a second motion compensation unit 10G for performing a motion compensation by magnifying the motion vector calculated in the spatial scalability BL of the temporal scalability BL twice;

a second residual coding unit 10H for calculating a residue between the predicted value of the high frequency subbands (LH, HL, HH) and an inputted high frequency subband (LH, HL, HH) when the motion-compensated result value is decomposed into four subbands (LL, LH, HL, HH) and outputting the residue;

a second buffer 101 for synthesizing the decoded low frequency element subband (LL) in the spatial scalability BL of the temporal scalability BL with the high frequency element subbands (LH, HL, HH) decoded in the spatial scalability EL of the temporal scalability BL and storing it;

a second residual decoding unit 10J for calculating a decoded residue;

a second motion estimation unit 10K for calculating independently a motion vector in the low frequency subband (LL) of the spatial scalability BL of the temporal scalability EL and outputting it;

a third motion compensation unit 10L for calculating a predicted value of the low frequency subband (LL) through a motion compensation;

a third residual coding unit 10M for calculating a residue between the predicted value of the low frequency subband (LL) and an inputted low frequency subband (LL) and outputting it; a fourth motion compensation unit 10N for magnifying the motion vector calculated in the spatial scalability BL of the temporal scalability EL twice and performing a motion compensation by using the magnified value; and a fourth residual coding unit 10O for calculating a residue between the predicted value of the high frequency subbands (LH, HL, RH) and the inputted high frequency subbands (LH, HL, HH) when the motion-compensated result value is decomposed into the four subbands (LL, LH, HL, HH) and outputting the residue.

4. A spatio-temporal hybrid scalable video coding apparatus using subband decomposition, comprising:

an encoder for applying a spatial scalability through a subband decomposition to a picture according to temporal scalability BL (base layer)/EL (enhancement layer) in order to decompose the picture into four subbands, coding one low frequency element subband in a spatial scalability BL, coding the rest three high frequency element subbands in a spatial scalability EL, magnifying a motion vector calculated through a motion estimation of the subband in the spatial scalability BL twice and using the magnified value for a motion compensation of the spatial scalability EL; and a decoder for restoring the picture of the spatial scalability BL separated from the temporal scalability BL/EL by decoding the low frequency element subband and restoring the picture of the spatial scalability EL separated from the temporal scalability BL/EL by performing a motion compensation by magnifying the motion vector of the spatial scalability BL twice. The apparatus of claim 1, wherein the decoder comprises:

a first motion compensation unit 20B for calculating a predicted value of a low frequency subband (LL) in the spatial scalability BL of the temporal scalability BL to be decoded by using a motion vector inputted from a variable length decoding unit 20A;

a first residual decoding unit 20C for calculating a decoded low frequency subband (LL) residue about a bit stream transmitted to the decoder;

a first buffer 20D for storing a decoded low frequency subband (LL) by adding the predicted value of first motion compensation unit 20B to the decoded residue of first residual decoding unit 20C;

a second motion compensation unit 20E for performing a motion compensation by magnifying the motion vector calculated in the spatial scalability BL of the temporal scalability BL twice;

a first subband analysis unit 20F for decomposing the motion-compensated value into four subbands (LL, LH, HL, HH);

a first subband synthesis unit 20H for calculating the high frequency element subbands (LH, HL, HH) of an EI or EP picture by adding the predicted value of the high frequency subbands (LH, HL, HH) to the decoded residue through the variable length decoding unit 20A and the second residual decoding unit 20G and restoring an EI or EP picture as a picture in the spatial region by synthesizing the subbands (LH, HL, HH) with the subband (LL) decoded in the spatial scalability BL of the temporal scalability BL;

a second buffer 20I for storing the restored macro block in spatial scalability EL of temporal scalability BL;

a third motion compensation unit 20J for calculating a predicted value of the low frequency subband (LL) in spatial scalability BL of the temporal scalability EL by using the I or P picture decoded in the spatial scalability BL of the temporal scalability BL and performing a motion compensation using the motion vector;

a third residual decoding unit 20K for calculating a decoded low frequency subband (LL) residue and restoring a B picture by adding the predicted value through the motion compensation to the decoded residue;

a fourth motion compensation unit 20L for calculating a predicted value of an EB picture by magnifying the motion vector in the spatial scalability BL of the temporal scalability EL twice and performing a motion compensation referencing an EL or EP picture decoded in the spatial scalability EL of the temporal scalability BL;

a second subband analysis unit 20M for decomposing the motion-compensated value into the four subbands (LL, LH, HL, RH);

a fourth residual decoding unit 20N for calculating a decoded macro-block residue about a bit stream transmitted to the decoder; and a second subband synthesis unit 20O for restoring an EB picture as a picture in the spatial region by calculating a high frequency element subbands (LH, HL, HH) value of the EB picture by adding the subbands (LH, HL, HH) as a predicted value of high frequency element to the residue decoded through the variable length decoding unit 20A and the fourth residual decoding unit 20K and synthesizing the calculated value with the subband (LL) decoded in the spatial scalability BL of the temporal scalability EL.

* * * * *